US008749836B2

(12) United States Patent
Reddy et al.

(10) Patent No.: US 8,749,836 B2
(45) Date of Patent: Jun. 10, 2014

(54) PAGE IMAGE TREATMENT

(75) Inventors: Prakash Reddy, Fremont, CA (US); Dudekula Shariff, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 13/567,633

(22) Filed: Aug. 6, 2012

(65) Prior Publication Data
US 2014/0036277 A1 Feb. 6, 2014

(51) Int. Cl.
*G06F 15/00* (2006.01)
*G06K 15/00* (2006.01)
*G06K 1/00* (2006.01)

(52) U.S. Cl.
USPC .............. 358/1.2; 358/1.1; 358/1.9; 358/1.18

(58) Field of Classification Search
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 7,420,699 | B2 | 9/2008 | Farrell et al. |
| 7,646,500 | B2 | 1/2010 | Uejo et al. |
| 8,098,390 | B1 | 1/2012 | Yacoub et al. |
| 8,098,398 | B2 | 1/2012 | Takasaki et al. |
| 2005/0073570 | A1 | 4/2005 | Alden |
| 2009/0059289 | A1 | 3/2009 | Shintoku et al. |

OTHER PUBLICATIONS

Brown, M.S. et al., Correcting Common Distortions in Camera-imaged Library Materials, (Research Paper), Proceedings. 2003 Joint Conference on Digital Libraries, May 27-31, 2003 pp. 367-368, http//:ieeexplore.ieee.org/stamp/stamp.isp?arnumber=1204890.

Canon U.S.A., INC., "Canon imageRunner Advance: C9075 PRO, 9065 PRO," 2010, <http://www.oceproductionprinting.com/download.aspx?id=07a75e60-7fc1-4670-a82d-14308d63f7eb&type=PDFFile>, <http://www.oceproductionprinting.com/products/canon-imagerunner-advance-c9075-pro/default.aspx?from=/products/productionprinting/digitalpresses/cutsheet>.

Canon USA INC., "Canon imageRUNNER 5075 / 5065 / 5055," available Dec. 29, 2009, <https://web.archive.org/web/20091229011619/http://www.usa.canon.com/cpr/pdf/Brochures/copier.

Sharp Electronics Corporation, "Collectively Copying Originals of Different Sizes (Mixed Size Original)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343.

(Continued)

*Primary Examiner* — Thierry L Pham

(57) ABSTRACT

An average size of a plurality of page images is determined, and a size of a first one of the page images is determined. The size of the first page image is compared to the average size. If the size of the first page image is larger than the average size by a first predetermined amount and larger than the average size by less than a second predetermined amount, then the first page image is rotated for printing. If the size of the first page image is larger than the average size by at least the second predetermined amount, then the first page images divided into multiple pages for printing.

20 Claims, 4 Drawing Sheets

(56) References Cited

OTHER PUBLICATIONS

Sharp Electronics Corporation, "Copying a Pamphlet (Book Copy)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343.

Sharp Electronics Corporation, "Copying Multiple Originals on Each Pamphlet Copy Page (Pamphlet Copy 2IN1/4IN1)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343/http://www.sharpusa.com/ForBusiness/DocumentSystems/MFPsPrinters/MX7040N.aspx>.

Sharp Electronics Corporation, "Making Copies in Pamphlet Format (Pamphlet Copy)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343/http://www.sharpusa.com/ForBusiness/DocumentSystenns/MFPsPrinters/MX7040N.aspx>.

Sharp Electronics Corporation, "Scanning Originals of Different Sizes (Mixed Size Original)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343/http://www.sharpusa.com/ForBusiness/DocumentSystems/MFPsPrinters/MX7040N.aspx>.

Sharp Electronics Corporation, "Sending a Large Number of Pages (Job Build)," Digital Full-Color Multifunction Machine MX-6240N/MX-7040N User's Manual, available Jul. 26, 2012, <http://files.sharpusa.com/Downloads/ForBusiness/DocumentSystems/MFPsPrinters/Manuals/MX6240N_7040N/contents/00-000.htm>, <https://web.archive.org/web/20120726050343/http://www.sharpusa.com/ForBusiness/DocumentSystenns/MFPsPrinters/MX7040N.aspx>.

PAGE IMAGE TREATMENT

BACKGROUND

Print on demand (POD) is a printing technology wherein digital or hard copies of a document such as a book or magazine are printed in small quantities or even one at a time, typically when an order for the document has been received. POD is useful, for example, for specialty documents, test marketing documents, and when producing copies of older works that are out of print. Digital printing technologies facilitate the POD process, since it generally is not economical to print single copies with prior printing technologies such as letterpress and offset printing.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Printed books or magazines often have some oversized pages—pages that are larger than the rest of the document's pages. Sometimes these pages are folded to fit the width and height of the containing documents, and accordingly, are commonly referred to as foldouts. When foldout document pages are stored as digital images for POD services, printing the containing documents can be problematic.

Examples of systems and methods disclosed herein include determining an average size of a plurality of page images and determining a size of a first one of the page images. The size of the first page image is compared to the average size, and based on the comparison, certain page images are identified as oversized, or foldout pages and these page images are modified for printing.

Figure 1:
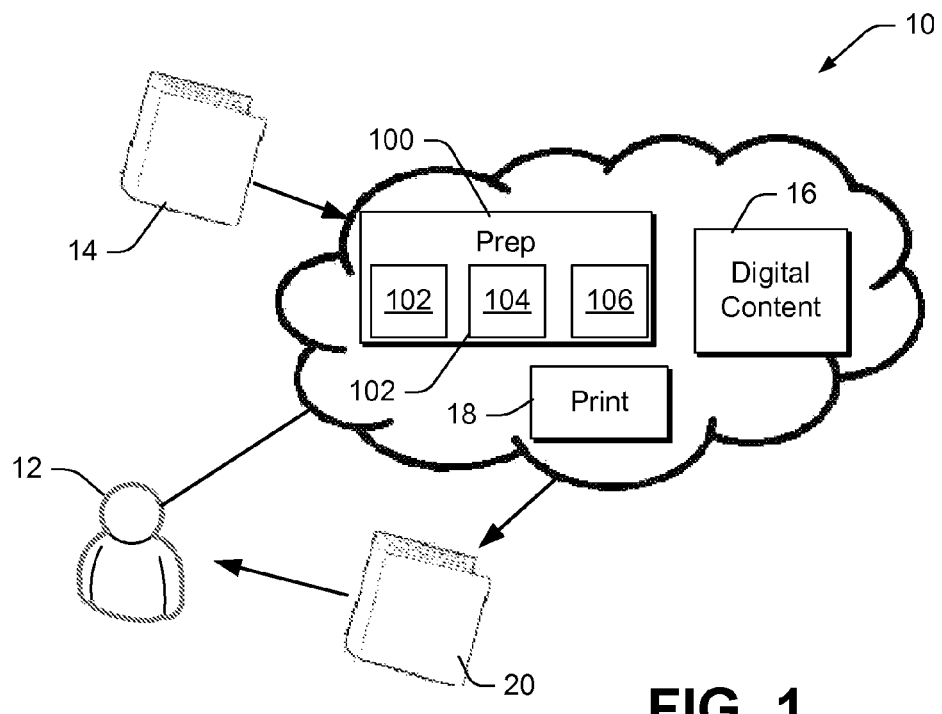
FIG. 1 is a block diagram illustrating aspects of an example of a Print on Demand system having a content preparation system that, among other things, identifies and handles oversized document pages.

FIG. 1 illustrates an example of a print on demand (POD) system 10. In some implementations, the POD system is implemented as a web service that allows book publishers/content owners offer books and other documents on line. A consumer 12 can search document collections, read books online, order printed or digital copies, etc. The system 10 includes a content preparation system 100 that takes scanned images of book or other document pages and prepares them for the POD system 10. For example, the pages of an out of print book 14 are scanned and the scanned page images are provided to the preparation system 100, which cleans up artifacts that exist due to age or that are introduced during the scanning process. The digital content 16 can then be packaged into various formats for both print and online distribution. If the consumer 12 desires a hard copy of the book 14, the digital content 16 is provided to a printer 18 to produce a printed copy 20.

Printed books or magazines such as the out of print book 14 often have oversized pages that are larger than the rest of the document pages. These oversized pages are folded in to fit the width and height of the containing book and are therefore commonly referred to as "foldout pages" or "foldouts." Printing documents that have foldouts can be problematic with POD systems. Sometimes foldout pages are removed from the book, but this results in a loss of information. Alternatively, foldout pages are reduced in size such that they fit the size of the book page. Simply reducing the image size, however, can result in a very small and illegible image. The content preparation system 100 includes a page input module 102, a page measurement module 104, and a page image output module 106 that formats such page images for printing.

Figure 2:
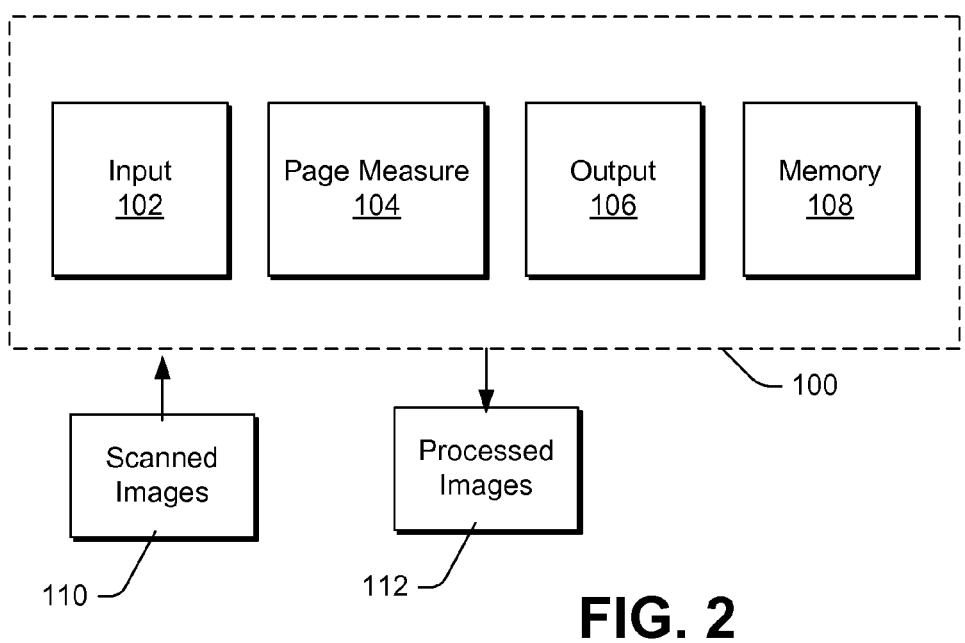
FIG. 2 is a block diagram illustrating aspects of an example of the content preparation system shown in FIG. 1.

FIG. 2 conceptually illustrates aspects of an implementation of a document preparation system 100 that, among other things, processes oversized, or foldout pages. The content preparation system 100 includes a page input module 102, an page measurement module 104, a page image output module 106 and a memory 108. The system 100 may be implemented by a computer system including one or more discrete modules (or data processing components) that are not limited to any particular hardware, firmware, or software configuration. In the example illustrated in FIG. 2, the system 100 includes an appropriately programmed processor that may be implemented by any suitable computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component and in other implementations the respective functionalities of each of one or more of the modules are performed by a respective set of multiple data processing components.

Software code embodying disclosed methods may be stored in the memory 108 or another non-transitory tangible storage medium that is accessible by the content preparation system 100. Non-transient storage media suitable for tangibly embodying program instructions and image data include all forms of computer-readable memory, including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM.

Digital page images 110 are analyzed by the system 100. As noted above, the page images 110 are scanned images of a book or other document pages in some implementations. The images 110 are received by the page image input module 102 and may be stored in the memory 108, or in another memory device accessible by the page preparation system 100, via a network such as the internet, for example. Generally, the scanned images 110 are analyzed by the page measurement module 104 and over-sized pages such as foldouts are identified. These pages are then processed by the system 100 and output by the page image output module 106 in a modified form as processed images 112, and then can be included in a document delivered to a consumer in a digital or printed form. In some embodiments, the processed images 112 are stored in the memory 108 or other memory for printing.

Figure 3:
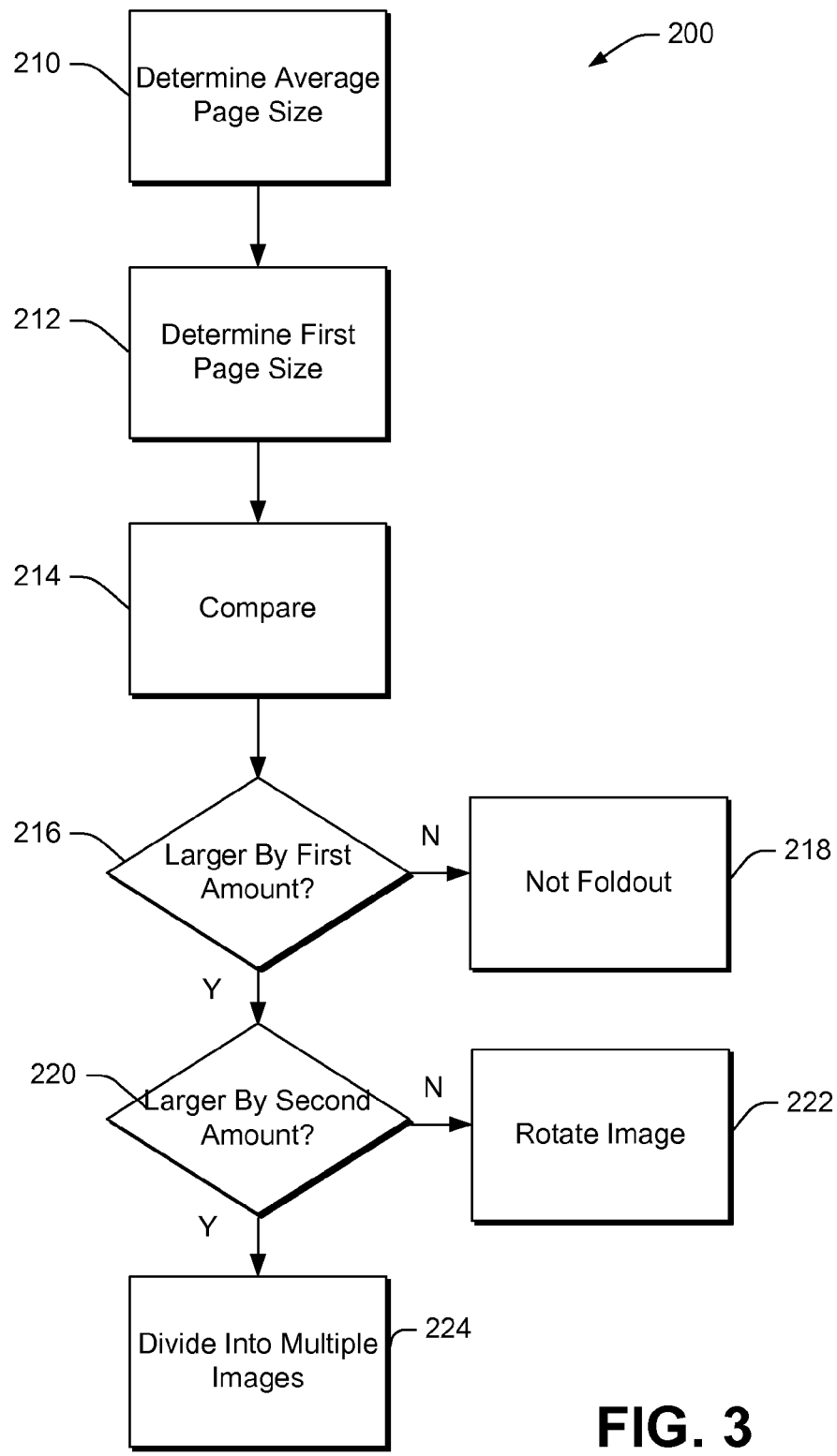
FIG. 3 is a flow diagram illustrating an example of a method for handling oversized document images.

FIG. 3 illustrates an example of a method 200. Software code for the method 200 may be stored in the memory 108 and implemented by the system 100, for handling foldouts or other over-sized document pages. In the implementation illustrated in FIG. 2, the page images 110 are pages of the out of print book 14. In block 210 of FIG. 3, the system 100 determines the average size of the page images 110, and in block 212 the size of a first one of the page images is determined. In certain implementations, the page size is determined based on Dots per Inch (DPI) and the number of pixels for the page. Thus, the page width would be the pixel width divided by DPI, and the page height would be the pixel height divided by DPI. For example, a 1,800×2,700 pixel page with a DPI of 300 is a 6 inch by 9 inch page. In some instances, page images 110 may have been captured at different resolutions during the scanning process. For example, some of the pages may be captured at 300 DPI and others at 600 DPI. In cases such as these, a normalization process is used prior to processing the document for POD. In still further implementations, metadata associated with the page images identifies page sizes and/or foldout pages. Thus, examining the metadata allows the system to directly identify foldout pages.

In some implementations, the page width is used as the page size measurement. In alternative implementations, other measurements such as the page height are used, or the height and width can be used to determine the page area. Sometimes foldout pages extend out both horizontally and vertically such that the page is larger than the average page size on both the height and width dimensions. Using a page area measurement in such situations can be advantageous.

In block 214, the system 100 compares the size of the first page image to the average size. In decision block 216, if the size of the first page image is not larger than the average size by at least a first predetermined amount, the first page image is determined to not be a fold out as shown in block 218. If the page is only slightly larger than the average page size, it can simply be reduced in size for printing.

If the size of the first page image is larger than the average size by at least the first predetermined amount and larger than the average size by less than a second predetermined amount as determined in decision block 220, then the first page is identified as a foldout page and it is rotated for printing in block 222. If the size of the first page image is larger than the average size by at least the second predetermined amount in block 220, then the first page image is divided into multiple pages for printing in block 224.

Figure 4:
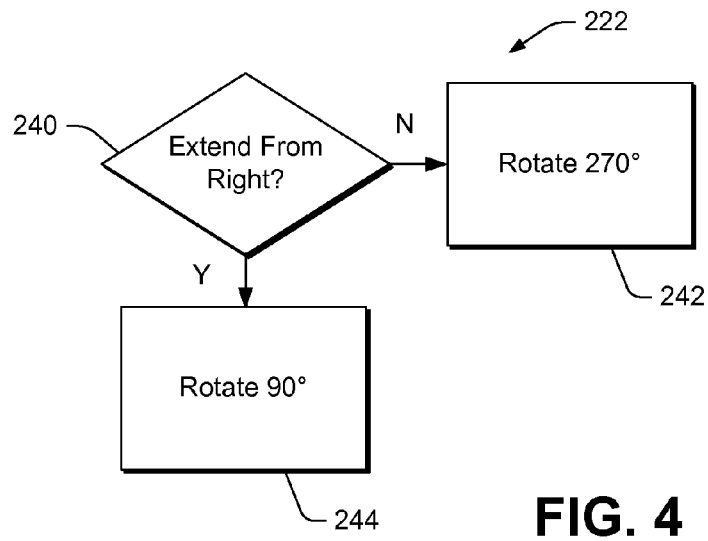
FIG. 4 is a flow diagram illustrating an example of further aspects of a method for handling oversized document images.

As noted above, in block 222 of FIG. 3, the page image is rotated for printing. FIG. 4 illustrates further aspects of block 222 in accordance with some implementations. Since first page image has been identified as a foldout page, it has a portion that extends from the containing document. The direction the image is rotated in block 222 is determined depends on whether the foldout portion of the page extends from the left or right side of the document. If it is determined in decision block 240 that the foldout image extends from the right side of the page, the image is rotated 90°. If the image does not extend out from the right side—it extends from the left—then the image is rotated 270°.

Figure 5A:
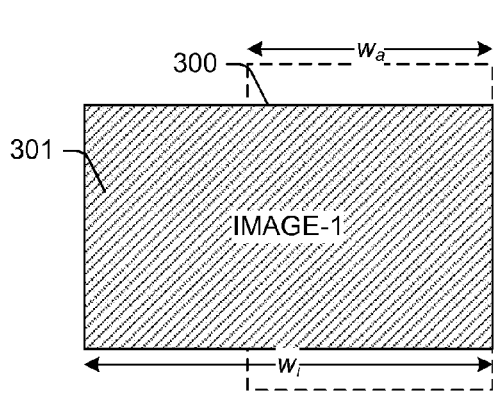
FIGS. 5A-5D illustrate examples of oversized document handling.
Figure 5B:
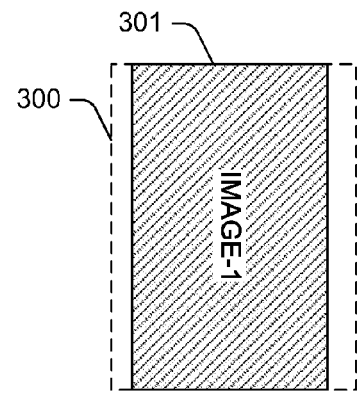

FIGS. 5A-5D illustrate an example foldout page image, IMAGE-1 301. The rectangle shown in broken line represents the average page size 300. In the example illustrated in FIGS. 5A-5D, the page width is used as the page size measurement, and the average page size 300 has a width $w_a$. IMAGE-1 301 has a width $w_i$. As shown in FIG. 5A, the width of IMAGE-1 301 is more than 1.5 times the width of the average page 300, but less than 2 times the width. In other words, $2w_a > w_i > 1.5w_a$. Thus, in accordance with block 222 of FIG. 3, IMAGE-1 301 is rotated as illustrated in FIG. 5B. Further, in the illustrated example IMAGE-1 301 is reduced in size such that it fits within the average page size 300. However, by rotating the image, the amount of reduction to fit IMAGE-1 301 within the average page size 300 is far less than would be required had the image not been rotated.

Figure 5C:
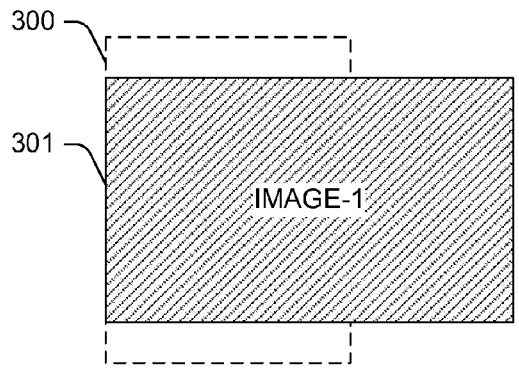
Figure 5D:
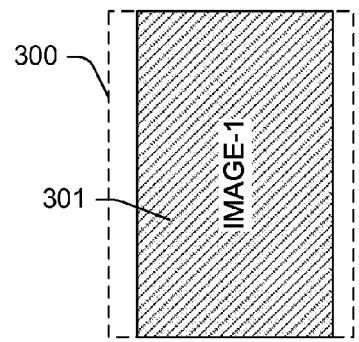

Further, as illustrated in FIG. 5A, the IMAGE-1 301 extends from the right side of the page 300, so that it opens to the left of the page 300. Thus, in accordance with the example illustrated in FIG. 4, the image is rotated 90° as illustrated in FIG. 5B. FIG. 5C illustrates an example where IMAGE-1 301 extends from the left side so that it opens to the right of the page 300, and therefore the image is rotated 270° as illustrated in FIG. 5D. In some implementations, a blank page is added before and/or after the rotated foldout page as necessary to maintain the page layout of the original document. Adding the blank page(s) keeps the paging arrangement (left and right page sides) the same as in the original document, preserving the page ordering for the remainder of the document.

Figure 6A:
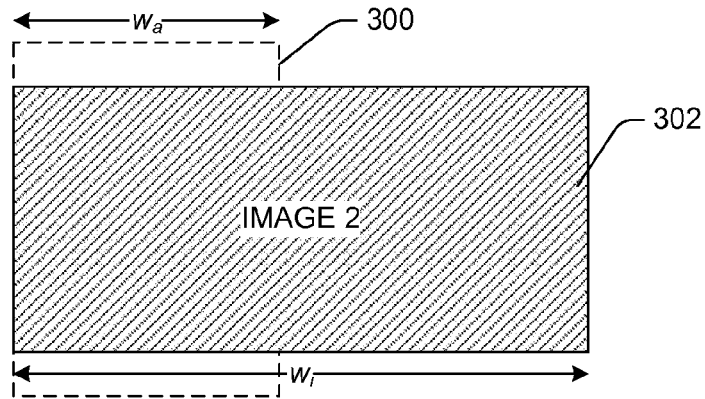
FIGS. 6A-6C illustrate further examples of oversized document handling.
Figure 6B:
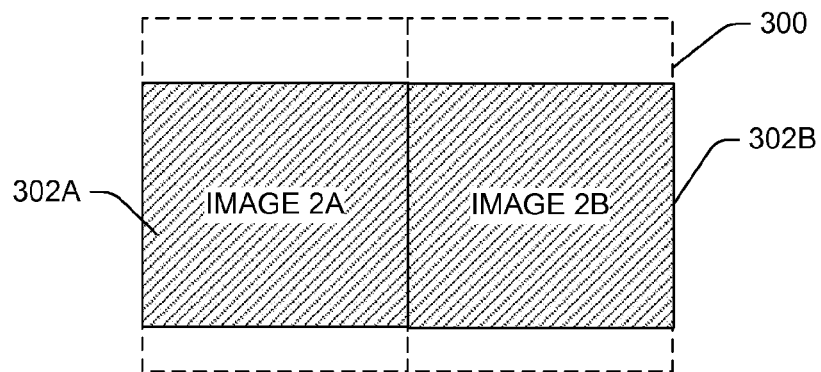
Figure 6C:
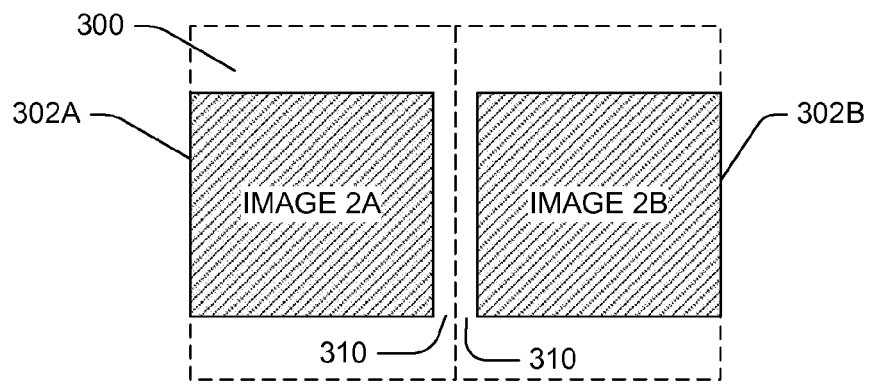

FIGS. 6A-6C illustrate another example foldout page image, IMAGE-2 302. As in FIGS. 5A-5D, the rectangle shown in broken line represents the average page size 300, and the page width is used as the page size measurement. In FIG. 5A, the width $w_i$ of IMAGE-2 302 is more than 2 times the width $w_a$ of the average page 300. In other words, $w_i > 2w_a$. Thus, in accordance with block 224 of FIG. 3, IMAGE-2 302 is divided into multiple images.

As illustrated in FIGS. 6B and 6C, the IMAGE-2 302 is divided into two parts IMAGE-2A and IMAGE-2B 302A, 302B. In some implementations, the images 302A, 302B are resized to fit across the entire width of two pages 300 as shown in FIG. 6B. In other implementations, gutter space 310 is added along the inside portions of the pages 300 as illustrated in FIG. 6C. This prevents portions of IMAGE-2 302 from being hidden inside the gutter. Adding the gutter spaces 310 is effective, for example, for documents with many pages. The gutter spaces typically are not used for documents with few pages, and/or when a staple binding is used. In some implementations, additional blank pages are added before and after the sheets 300 when the image is split into multiple parts as in FIGS. 6B and 6C. Adding the blank pages keeps the paging arrangement (left and right page sides) the same as in the original document, preserving the page ordering for the remainder of the document.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
a page image input module configured to receive a plurality of page images;
a page measurement module configured to:
   determine an average size of the plurality of page images;
   determine a size of a first one of the page images;
   compare the size of the first page image to the average size; and
a page image output module configured to:
   if the size of the first page image is larger than the average size by a first predetermined amount and larger than the average size by less than a second predetermined amount, then rotate and output the first page image for printing;
   if the size of the first page image is larger than the average size by at least the second predetermined amount, then divide the first page image into multiple page images and output the multiple page images for printing.

2. The system of claim 1, further comprising:
a printer configured to print the first page image.

3. The system of claim 1, further comprising:
a memory storing the plurality of page images.

4. The system of claim 1, wherein the page image output module is further configured to:
resize the first page image.

5. The system of claim 1, wherein the first predetermined amount is 1.5 times the average size.

6. The system of claim 1, wherein the second predetermined amount is 2 times the average size.

7. The system of claim 1, wherein the page image output module is further configured to:
insert at least one blank page image.

8. The system of claim 1, wherein the page image output module is further configured to:
divide the first page image into first and second page images; and
include a gutter space on the first and second page images.

9. The system of claim 1, wherein:
the plurality of page images are pages of a document;
the first page image includes a portion that extends from a first or a second side of the document; and
wherein rotating the first page image for printing includes determining a rotation direction based on whether the portion of the first page extends from a first or a second side of the document.

10. A method, comprising:
determining an average size of a plurality of page images;
determining a size of a first one of the page images;
comparing the size of the first page image to the average size;
if the size of the first page image is larger than the average size by a first predetermined amount and larger than the average size by less than a second predetermined amount, then rotating the first page image for printing;
if the size of the first page image is larger than the average size by at least the second predetermined amount, then dividing the first page image into multiple pages for printing; and
printing the first page image.

11. The method of claim 10, further comprising:
resizing the first page image.

12. The method of claim 10, wherein the first predetermined amount is 1.5 times the average size.

13. The method of claim 10, wherein the second predetermined amount is 2 times the average size.

14. The method of claim 10, further comprising:
inserting at least one blank page image.

15. The method of claim 10, further comprising:
dividing the first page image into first and second page images; and
including a gutter space on the first and second page images.

16. The method of claim 10, wherein:
the plurality of page images are pages of a document;
the first page image includes a portion that extends from a first or a second side of the document; and wherein
rotating the first page image for printing includes determining a rotation direction based on whether the portion of the first page extends from a first or a second side of the document.

17. A non-transitory computer readable storage medium storing instructions for controlling a processor to perform a method, comprising:
determining an average size of a plurality of page images;
determining a size of a first one of the page images;
comparing the size of the first page image to the average size;
if the size of the first page image is larger than the average size by a first predetermined amount and larger than the average size by less than a second predetermined amount, then rotating the first page image for printing;
if the size of the first page image is larger than the average size by at least the second predetermined amount, then dividing the first page image into multiple pages for printing.

18. The non-transitory computer readable storage medium of claim 17, further comprising printing the first page image.

19. The non-transitory computer readable storage medium of claim 17, wherein the first predetermined amount is 1.5 times the average size.

20. The non-transitory computer readable storage medium of claim 17, wherein the second predetermined amount is 2 times the average size.

* * * * *